United States Patent
Kimura

(10) Patent No.: US 9,375,960 B2
(45) Date of Patent: Jun. 28, 2016

(54) SPRING FIXING MEMBER AND INK JET RECORDING HEAD

(71) Applicant: CANON KABUSHIKI KAISHA, Tokyo (JP)

(72) Inventor: Satoshi Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/703,057

(22) Filed: May 4, 2015

(65) Prior Publication Data

US 2015/0345696 A1 Dec. 3, 2015

(30) Foreign Application Priority Data

May 30, 2014 (JP) .................................. 2014-112189

(51) Int. Cl.
| B41J 2/175 | (2006.01) |
| B41J 29/02 | (2006.01) |
| F16F 1/12  | (2006.01) |

(52) U.S. Cl.
CPC ................ *B41J 29/02* (2013.01); *B41J 2/1752* (2013.01); *B41J 2/17509* (2013.01); *F16F 1/125* (2013.01); *F16F 2230/0005* (2013.01)

(58) Field of Classification Search
CPC ............................ B41J 2/1752; B41J 2/17509
See application file for complete search history.

(56) References Cited

U.S. PATENT DOCUMENTS

| 8,061,690 B2 | 11/2011 | Desprez et al. |
| 2005/0270342 A1* | 12/2005 | Ogura .................... B41J 2/1752 347/85 |

FOREIGN PATENT DOCUMENTS

| JP | H2-124331 U | 10/1990 |
| JP | H2-261933 A | 10/1990 |
| JP | H8-277867 A | 10/1996 |
| JP | 2009-519419 A | 5/2009 |
| JP | 2009-127533 A | 6/2009 |
| JP | 2013-252616 A | 12/2013 |

OTHER PUBLICATIONS

Japanese Office Action mailed Sep. 1, 2015, in corresponding Japanese Patent Application No. 2014-112189.

* cited by examiner

*Primary Examiner* — Stephen Meier
*Assistant Examiner* — Patrick King
(74) *Attorney, Agent, or Firm* — Fitzpatrick, Cella, Harper & Scinto

(57) ABSTRACT

A coil spring fixing member includes: a mount member having an arrangement surface on which an end portion of the coil spring is disposed; a boss provided on the arrangement surface, on which boss the coil spring is fitted; and a protrusion provided at a site on a side surface of the boss, the site being apart from the arrangement surface by at least a wire diameter of the coil spring, wherein the protrusion is engaged with winding of the coil spring disposed between the arrangement surface and the protrusion, and a portion of the boss ranging includes a first region having a first diameter, and a second region which is nearer to the end portion than the first region and has a diameter smaller than the first diameter, and a step intervenes between the first region and the second region.

8 Claims, 5 Drawing Sheets

SPRING FIXING MEMBER AND INK JET RECORDING HEAD

BACKGROUND OF THE INVENTION

1. Field of the Invention

The present invention relates to a spring fixing member and an ink jet recording head and, in particular, to a spring fixing member for fixing a coil spring and an ink jet recording head including the same.

2. Description of the Related Art

As described in Japanese Patent Application Laid-Open No. 2009-127533, one of members for fixing a coil spring is a spring fixing member that fixes only one end portion of the coil spring.

FIG. 8 is a perspective view illustrating a spring fixing member 11 of a related art. The spring fixing member 11 is provided with a boss 12 on a mounting surface 11a. The diameter of the boss 12 is substantially identical to the inner diameter of the coil spring. A protrusion 13 is provided on a side surface 12a of the boss 12.

To attach the coil spring, the coil spring is brought into engagement with the boss 12 so that the coil spring is externally fitted on the boss 12. The coil spring is handled such that the end portion of the coil spring on the side of the mounting surface 11a is moved beyond the protrusion 13, whereby the protrusion 13 prevents the coil spring from being disconnected from the boss 12. Typically, the spring fixing member is configured such that the protrusion 13 intervenes between a first turn of winding, which is an end portion of the coil spring, and a second turn of winding after the coil spring is attached.

If the coil spring is insufficiently mounted on the spring fixing member 11 and a first turn of winding of the coil spring is not beyond the protrusion 13, the coil spring may possibly be disconnected from the spring fixing member 11 by, for example, vibrations.

Meanwhile, even if the coil spring is insufficiently mounted on the spring fixing member 11, the coil spring is in a state of being fitted on the boss 12 having a diameter substantially identical to the inner diameter of the coil spring. Accordingly, the coil spring is hardly inclined from the axis direction of the boss 12. Thus, even inspection of the state of the coil spring in the axis direction of the boss 12 cannot discriminate a normal state. Therefore, inspection of whether the first turn of winding of the coil spring is beyond the protrusion 13 or not is required to determine whether the coil spring is securely fixed or not.

However, for example, if another member is arranged around the spring fixing member 11, visual inspection of the state of engagement between the protrusion 13 and the coil spring may be difficult. In such a case, there is a problem of difficulty to inspect whether the coil spring is securely fixed or not.

SUMMARY OF THE INVENTION

The present invention is directed to providing a spring fixing member for fixing a coil spring includes: a mount member having an arrangement surface on which an end portion of the coil spring is disposed; a boss provided on the arrangement surface, on which boss the coil spring is fitted; and a protrusion provided at a site on a side surface of the boss, the site being apart from the arrangement surface by at least a wire diameter of the coil spring, wherein the protrusion is engaged with winding of the coil spring disposed between the arrangement surface and the protrusion to prevent the coil spring from being disconnected from the boss, and a portion of the boss ranging from the protrusion to an end portion of the boss in an opposite direction away from the arrangement surface includes a first region having a first diameter, and a second region which is nearer to the end portion than the first region and has a diameter smaller than the first diameter, and a step intervenes between the first region and the second region.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
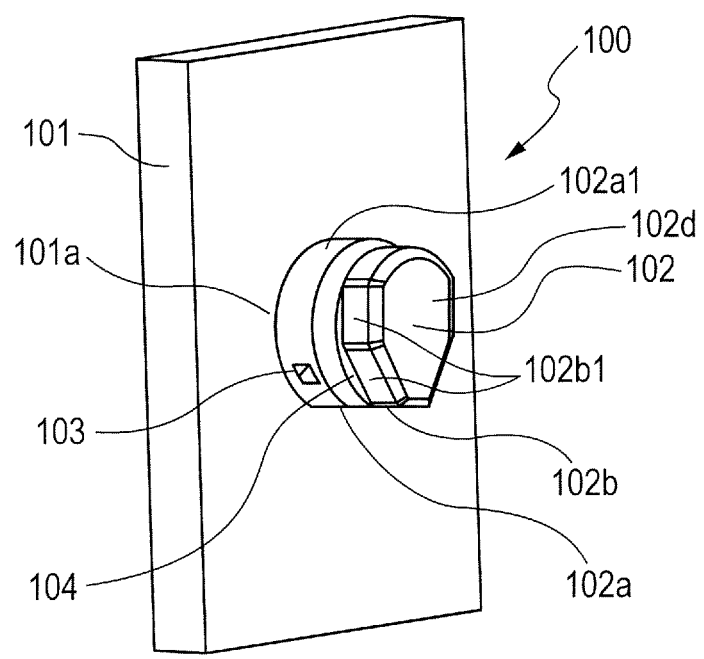
FIG. 1 is a perspective view of a spring fixing member 100 of a first embodiment of the present invention.
Figure 2A:
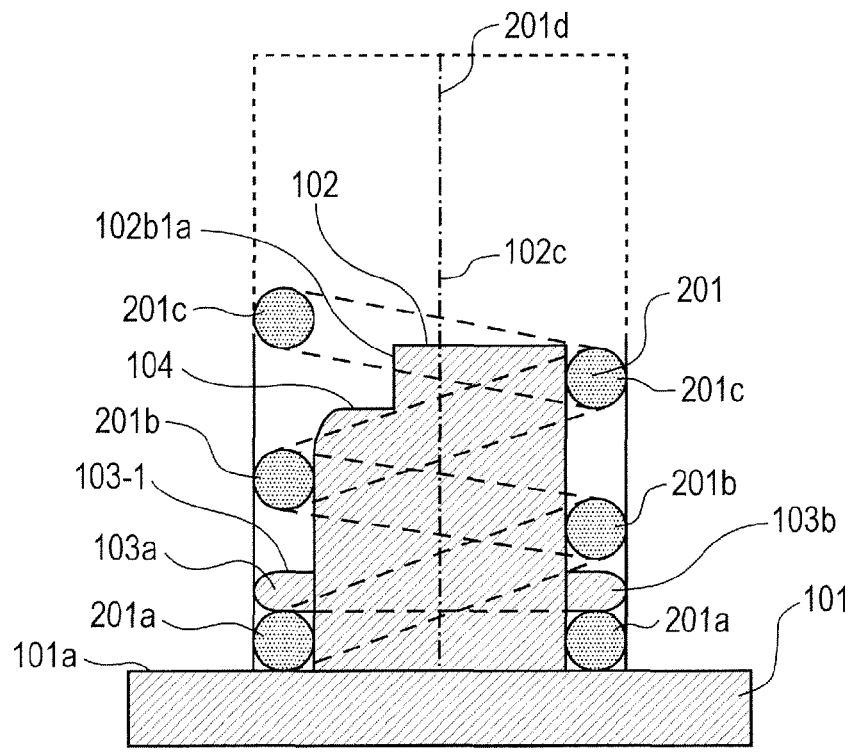
FIG. 2A is a schematic diagram illustrating a mounting state of a coil spring 201.
Figure 2B:
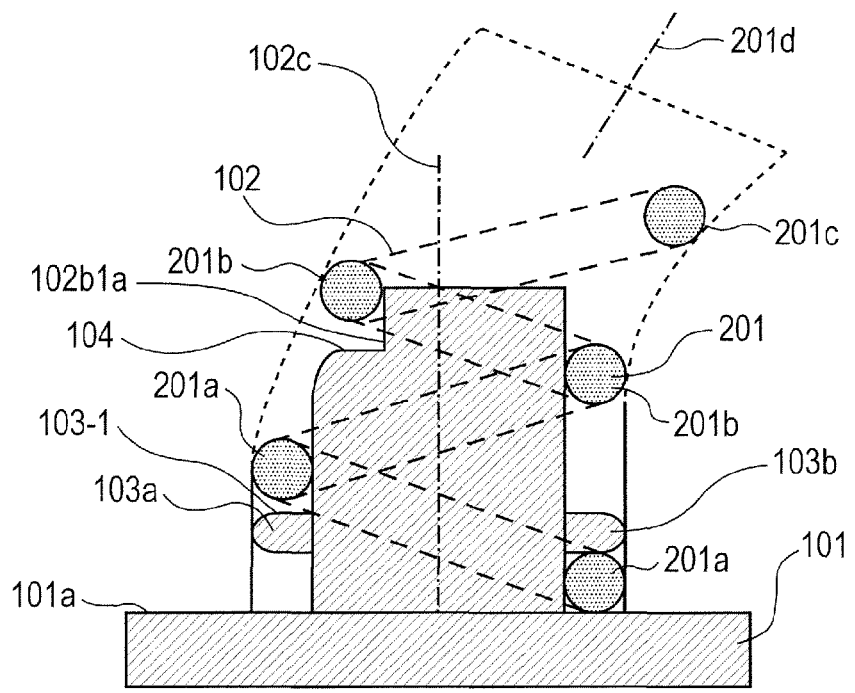
FIG. 2B is a schematic diagram illustrating another mounting state of the coil spring 201.

FIG. 1 is a perspective view of a spring fixing member 100 of a first embodiment of the present invention. FIGS. 2A and 2B are schematic diagrams illustrating mounting states of a coil spring 201 to the spring fixing member 100. FIG. 2A illustrates a state where the coil spring 201 is securely mounted. FIG. 2B illustrates a state where the coil spring 201 is insufficiently mounted.

The spring fixing member 100 includes a mount member 101, a boss 102 and protrusions 103.

The mount member 101 has a surface 101a on which a first turn of winding 201a of the coil spring 201 is arranged. The surface 101a is an example of an arrangement surface. The first turn of winding 201a of the coil spring 201 is an example of an end portion of the coil spring 201.

The boss 102 is provided on the surface 101a. The coil spring 201 is fitted on the boss 102. The diameter of a portion 102a of the boss 102 close to the surface 101a (hereinafter, called a "spring contact portion") is identical or substantially identical to the inner diameter of the coil spring 201.

The side surface 102a1 of the spring contact portion 102a is provided with the protrusions 103. In this embodiment, two protrusions 103a and 103b are provided. Each of the distance from the protrusion 103a to the surface 101a and the distance from the protrusion 103b to the surface 101a is identical or substantially identical to the wire diameter of the coil spring 201. The protrusions 103a and 103b may be provided at any site that is on the side surface 102a1 of the boss 102 and apart from the surface 101a by at least the wire diameter of the coil spring 201.

The protrusions 103a and 103b are configured so as to intervene between the first turn of winding 201a of the coil spring 201 and the second turn of winding 201b after the coil spring 201 is mounted. The protrusions 103a and 103b are engaged with the winding of the coil spring 201 disposed between the surface 101a and the protrusions 103a and 103b. This engagement prevents the coil spring 201 from being disconnected from the boss 102.

A portion (hereinafter, called an "inclination allowance portion") 102b of the boss 102 that is opposite to the spring contact portion 102a has a side surface 102b1 having a distance to the central axis 102c of the boss 102 that is equal to or shorter than half an inner diameter of the coil spring 201. The minimum value of the distance from the side surface 102b1 to the central axis 102c of the boss 102 is a length (hereinafter, called a "predetermined length") acquired by subtracting the wire diameter of the coil spring 201 from half the inner diameter of the coil spring 201.

A side portion 102b1a on the side surface 102b1 that ranges, to the end portion 102d of the boss 102, from a position deviating from the protrusions 103 in an opposite direction away from the surface 101a (arrangement surface) by a height for two turns of the coil spring 201 has a length to the central axis 102c that is equal to or shorter than the predetermined length.

A portion of the side surface of the boss 102 that ranges from the protrusions 103 to the end portion 102d is formed so as to have a distance to the central axis 102c of the boss 102 that stepwisely decreases with approaching the end portion 102d.

That is, the portion of the boss 102 that ranges from the protrusions 103a and 103b to the end portion of the boss 102 in an opposite direction away from the arrangement surface 101a is provided with a first region having a first diameter, and a second region that is nearer to the end portion than the first region and has a smaller diameter than the first diameter. A step 104 is formed between the first region and the second region. In a normal state, the first region of the boss is in contact with the winding 201b, but the second region is not in contact with the winding 201c.

Next, a mounting state of the coil spring 201 to the spring fixing member 100 is described.

A state where the coil spring 201 is fixed to the spring fixing member 100 is a state where the coil spring 201 is fitted on the boss 102, and the protrusions 103a and 103b intervene between the winding 201a and the winding 201b.

On the other hand, a state where the coil spring 201 is insufficiently mounted on the spring fixing member 100 is, for example, a state where the protrusion 103b intervenes between the winding 201a and the winding 201b but the winding 201a is disposed on a side of a surface 103-1 of the protrusion 103a that is nearer to the end portion 102d. In this state, the winding 201a is inclined from the surface 101a. According to the inclination of the winding 201a, a portion of the inner surface of the coil spring 201 that faces the side surface 102b1 approaches the side surface 102b1, thus bringing into a state where the coil spring 201 is inclined.

When the mounting state of the coil spring 201 to the spring fixing member 100 is viewed from the direction of the central axis 102c of the boss 102, the state is as follows.

In a state where the coil spring 201 is mounted, the central axis 102c of the boss 102 substantially coincides with the central axis 201d of the coil spring 201. On the other hand, in the state of insufficient mounting of the coil spring 201, the central axis 102c of the boss 102 and the central axis 201d of the coil spring 201 deviate from each other.

Accordingly, for example, the positional relationship between the central axis 201d of the coil spring 201 and the central axis 102c of the boss 102 is inspected from the direction of the central axis 102c of the boss 102, thereby enabling the mounting state of the coil spring 201 to be visually inspected. Accordingly, the mounting state of the coil spring 201 can be easily inspected without inspecting whether the protrusion 103 is securely engaged with the coil spring 201 or not as in the related art.

According to this embodiment, the distance from the side portion 102b1a to the central axis 102c of the boss 102 is equal to or shorter than the length (predetermined length) acquired by subtracting the wire diameter of the coil spring 201 from half the inner diameter of the coil spring 201. The side portion 102b1a is the portion on the side surface of the boss 102 that ranges, to the end portion 102d, from the position deviating from the protrusions 103 in an opposite direction away from the surface 101a by two turns of the coil spring 201. Accordingly, if the central axis 201d of the coil spring 201 substantially coincides with the central axis 102c of the boss 102, a gap is formed between the portion of the inner surface of the coil spring 201 that faces the side portion 102b1a and this side portion 102b1a.

If the coil spring 201 is insufficiently mounted and the end portion 201a of the coil spring 201 is disposed on the surface 103-1 of the protrusion 103, the portion of the inner surface of the coil spring 201 that faces the side portion 102b1a approaches the side portion 102b1a to incline the central axis 201d of the coil spring. Accordingly, inspection of the positional relationship between the central axis 201d of the coil spring 201 and the central axis 102c of the boss 102 allows easy inspection of whether the coil spring 201 is securely fixed or not.

In this embodiment, the number of protrusions 103 is not limited to two. Alternatively, the number may be any number at least one.

Second Embodiment

Figure 3:
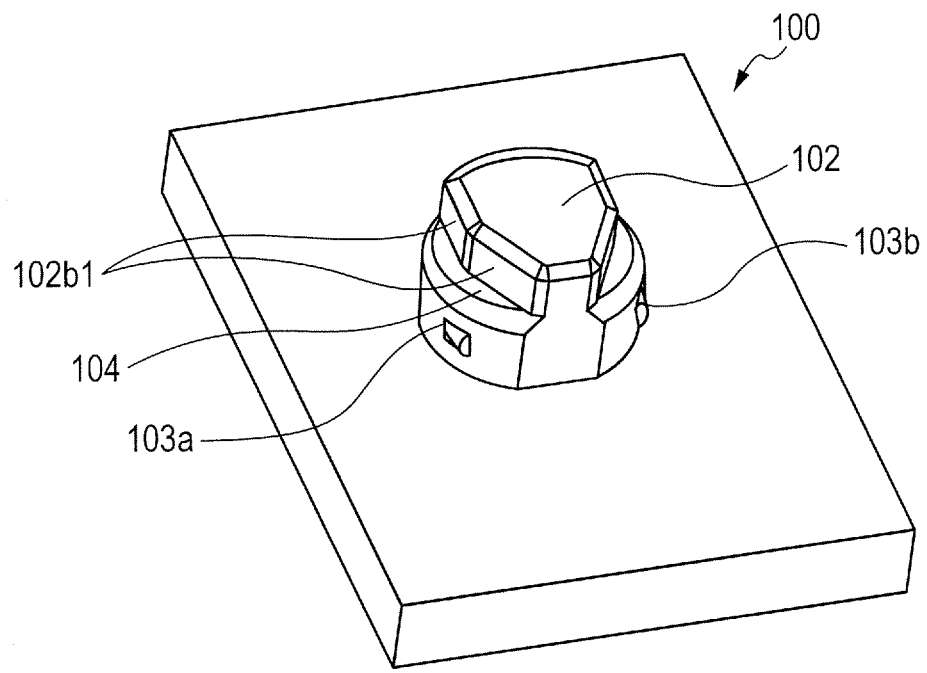
FIG. 3 is a perspective view of a spring fixing member 100 of a second embodiment of the present invention.
Figure 4:
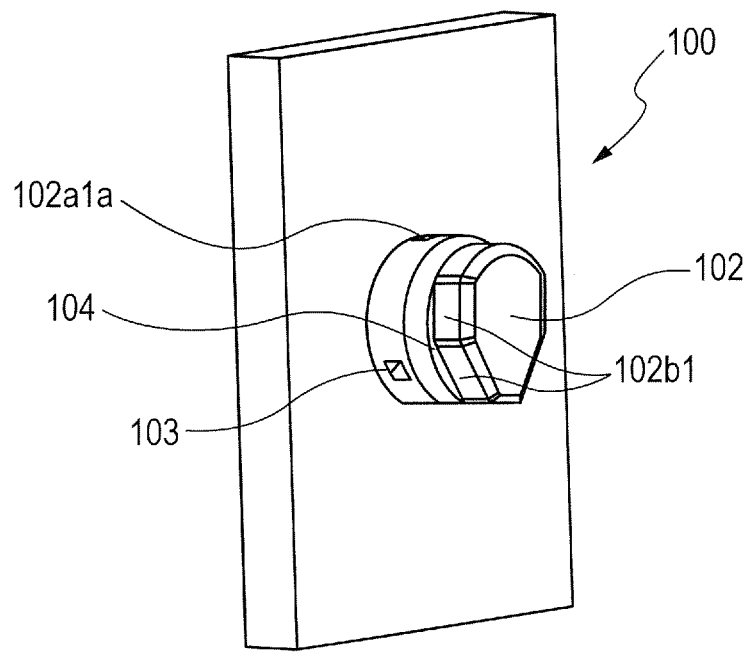
FIG. 4 is a perspective view of the spring fixing member 100 of the second embodiment of the present invention.

FIGS. 3 and 4 are perspective views of a spring fixing member 100 of a second embodiment of the present invention. In FIGS. 3 and 4, the same symbols are assigned to the same configuration elements as the elements illustrated in FIGS. 1 and 2.

Protrusions 103a and 103b are provided at two sites that are apart from a site 102a1a on a side surface 102a1, centered on the central axis 102c in the coil winding direction, by at least 45 degrees and less than 360 degrees; the distal end portion of winding 201a is disposed on this site 102a1a, after the coil spring 201 is mounted.

The coil spring 201 has a shape where the winding is spirally wound from the distal end portion of the first turn of winding 201a of the coil spring 201. Accordingly, the space between the winding 201a and the winding 201b is narrow around the pole of the distal end portion of the winding 201a. Accordingly, if a protrusion 103 that is larger than this space intervenes between the winding 201a and the winding 201b, the coil spring 201 is deformed. Deformation of the coil spring 201 causes a malfunction of mounting the coil spring 201, and a malfunction where the coil spring 201 cannot achieve predetermined spring characteristics.

In this embodiment, to prevent these malfunctions, the protrusions 103 are arranged on multiple sites that are apart from the site 102a1a, at which the distal end portion of the first turn of winding 201a is disposed, centered on the central axis 102c in the coil winding direction by at least 45 degrees and less than 360 degrees. This arrangement can prevent the protrusions 103 from being disposed around the pole of the distal end portion of the winding 201a. The number of sites is not limited to two. Alternatively, the number may be three or more.

An inclination allowance portion 102b has a side surface 102b1 including a side portion 102b1a. Accordingly, in the case where a malfunction of mounting occurs at the coil spring 201 irrespective of the protrusions 103, the portion on the inner surface of the coil spring 201 that faces the side portion 102b1a approaches the side portion 102b1a, thus bringing the entire coil spring 201 into a state of being inclined. Therefore, the mounting state of the coil spring 201 can be visually inspected by inspecting the positional relationship between the central axis 201d of the coil spring 201 and the central axis 102c of the boss 102 from the direction of the central axis 102c of the boss 102.

Third Embodiment

Figure 5:
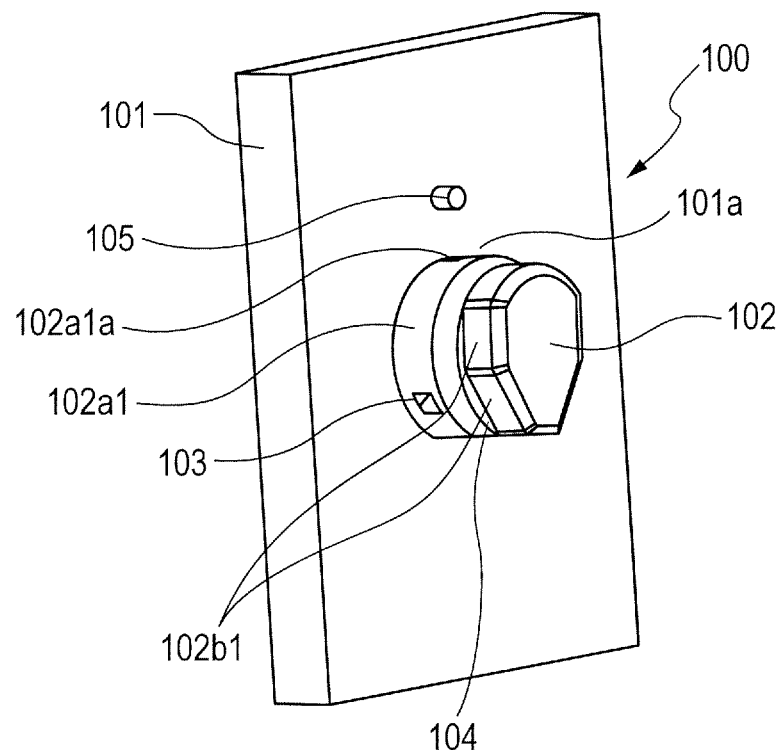
FIG. 5 is a perspective view of a spring fixing member 100 of a third embodiment of the present invention.
Figure 6:
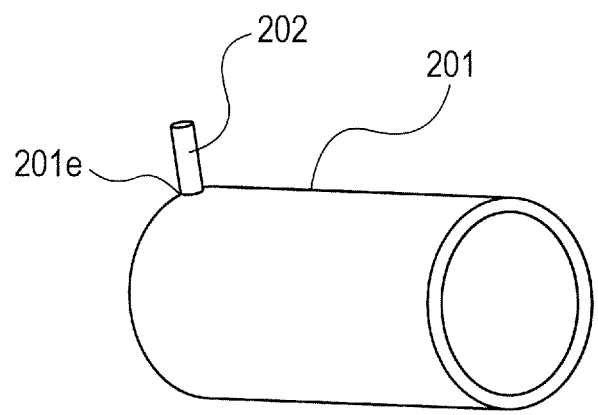
FIG. 6 is a perspective view illustrating a shape of a coil spring 201.

FIG. 5 is a perspective view of a spring fixing member 100 of a third embodiment of the present invention. In FIG. 5, the same symbols are assigned to the same configuration elements as the elements illustrated in FIGS. 1 to 4. FIG. 6 is a perspective view illustrating the shape of a coil spring 201 to be mounted on the spring fixing member 100 illustrated in FIG. 5.

In this embodiment, a projection 105 to be engaged with a bent portion 202 arranged at the distal end portion 201e of the winding 201a is provided on a surface 101a in addition to a boss 102 on which the coil spring 201 is fitted.

The shape of the coil spring can be changed so as to increase the diameter of the coil spring 201 by engaging the bent portion 202 with the projection 105 and turning the coil spring 201. This change facilitates mounting of the coil spring 201 on the protrusions 103.

Alternatively, the bent portion 202 may be configured so as to orient the distal end of the bent portion 202 toward the central axis of the coil spring 201, and a hole into which the bent portion 202 can be inserted may be formed at the site 102a1a on the side surface 102a1. In this case, the bent portion 202 is inserted into the hole formed at the site 102a1a, and the coil spring 201 is turned, thereby allowing the shape of the coil spring 201 to be changed so as to increase the diameter of the coil spring 201. This change facilitates mounting of the coil spring 201 on the protrusion 103.

Fourth Embodiment

Figure 7:
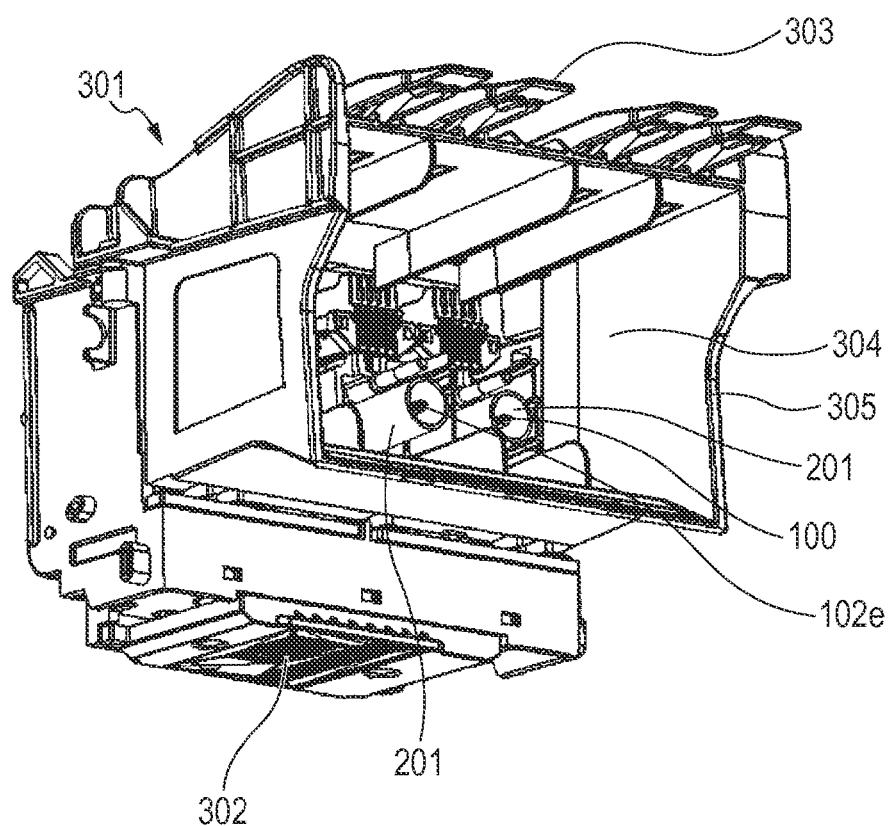
FIG. 7 is a perspective view of an ink jet recording head 301.
Figure 8:
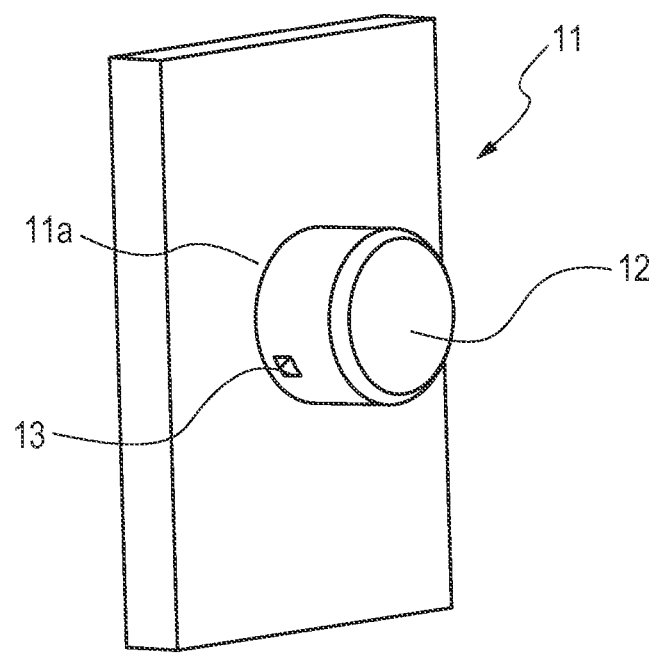
FIG. 8 is a perspective view of a spring fixing member 11 of a related art.

FIG. 7 is a perspective view of an ink jet recording head 301 that includes any of the spring fixing members 100 of the first to third embodiments.

The ink jet recording head 301 includes a recording element board that includes multiple energy generating elements for discharging liquid, such as ink, and discharges the liquid from multiple discharge ports 302.

A liquid storage tank (not illustrated) is installed from an opening 304 at the right of FIG. 7 into a housing 305, while pressing the coil spring 201. The tank is then locked by a tank lock lever 303, and fixed to an ink jet recording head 301. The liquid storage tank is an example of a liquid cartridge. The housing 305 is an example of a cartridge mounting portion. The coil spring 201 urges the liquid storage tank in a direction opposite to the installation direction. The tank lock lever 303 is an example of a lock member that latches the liquid storage tank against an urging force by the coil spring 201.

In the case of detaching the liquid storage tank, an operation of the tank lock lever 303 releases the locking of the liquid storage tank to allow the liquid storage tank to be pushed to the opening 304 by the coil spring 201.

The coil spring 201 is mounted on the spring fixing member 100 provided in the housing 305, from the opening 304 of the ink jet recording head 301. This configuration facilitates inspection of whether the coil spring 201 is fixed or not. More specifically, the deviation of the central axis 201d of the coil spring 201 from the central axis 102c of the boss 102 can be visually inspected from the opening 304.

The end portion 102d of the spring fixing member 100 illustrated in FIG. 7 is provided with a shaft 102e that coincides with the central axis 102c of the boss 102. This configuration can further facilitate inspection of the positional relationships of the shaft 102e and the coil spring 201 with the central axis 102c. The diameter of the shaft 102e is, for example, about one quarter of the inner diameter of the coil spring 201. However, the diameter of the shaft 102e is not limited to about one quarter of the inner diameter of the coil spring 201. Alternatively, the diameter of the shaft 102e may have any value equal to or less than the inner diameter of the coil spring 201.

In each of the embodiments, the entire side surface of the inclination allowance portion 102b may have a distance to the central axis 102c that is equal to or shorter than the predetermined length (the length acquired by subtracting the wire diameter of the coil spring 201 from half the inner diameter of the coil spring 201).

In each of the embodiments, the entire side surface of the inclination allowance portion 102b may have a distance to the central axis 102c of the boss 102 that stepwisely or continuously decreases with approaching the end portion 102d.

In each of the aforementioned embodiments, the illustrated configuration is only an example. The present invention is not limited to the configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-112189, filed May 30, 2014, which is hereby incorporated by reference herein in its entirety.

What is claimed is:

1. A spring fixing member for fixing a coil spring, comprising:
   a mount member having an arrangement surface on which an end portion of the coil spring is disposed;
   a boss provided on the arrangement surface, on which boss the coil spring is fitted; and
   a protrusion provided at a site on a side surface of the boss, the site being apart from the arrangement surface by at least a wire diameter of the coil spring,
   wherein the protrusion is engaged with at least one winding of the coil spring disposed between the arrangement surface and the protrusion to prevent the coil spring from being disconnected from the boss, and
   a side portion, which is on the side surface of the boss and ranges from a position deviating from the protrusion in an opposite direction away from the arrangement surface by a height for two turns of the coil spring to an end portion of the boss in the opposite direction, the side portion includes a portion having a distance to a central axis of the boss, the distance being equal to or shorter than a length acquired by subtracting the wire diameter of the coil spring from half an inner diameter of the coil spring.

2. The spring fixing member according to claim 1, wherein the protrusion is provided at each of a plurality of sites away from a site on the side surface of the boss at which a distal end portion of the winding at an end portion of the coil spring is disposed, centered on the central axis of the boss in a winding direction of the coil spring by at least 45 degrees and less than 360 degrees.

3. The spring fixing member according to claim 2, wherein the plurality of sites are two sites.

4. The spring fixing member according to claim 1, further comprising a projection provided on the arrangement surface, the projection being engaged with a bent portion provided on the distal end portion of the winding of the coil spring, when the coil spring is fitted on the boss.

5. An ink jet recording head, comprising:
a plurality of discharge ports for discharging liquid;
a cartridge mounting portion in which a liquid cartridge for storing liquid is installed;
a coil spring which urges the liquid cartridge in a direction opposite to an installation direction;
a lock member which latches the liquid cartridge against an urging force by the coil spring; and
the spring fixing member according to claim 1 for fixing the coil spring to the cartridge mounting portion.

6. A spring fixing member for fixing a coil spring, comprising:
a mount member having an arrangement surface on whichan end portion of the coil spring is disposed;
a boss provided on the arrangement surface, on which boss the coil spring is fitted; and
a protrusion provided at a site on a side surface of the boss, the site being apart from the arrangement surface by at least a wire diameter of the coil spring,
wherein the protrusion is engaged with winding of the coil spring disposed between the arrangement surface and the protrusion to prevent the coil spring from being disconnected from the boss, and
a portion, which is on the side surface of the boss and ranges from the protrusion to an end portion of the boss in an opposite direction away from the arrangement surface, the portion has a distance to a central axis of the boss, the distance stepwisely decreasing when approaching the opposite end portion.

7. A spring fixing member for fixing a coil spring, comprising:
a mount member having an arrangement surface on which an end portion of the coil spring is disposed;
a boss provided on the arrangement surface, on which boss the coil spring is fitted; and
a protrusion provided at a site on a side surface of the boss, the site being apart from the arrangement surface by at least a wire diameter of the coil spring,
wherein the protrusion is engaged with winding of the coil spring disposed between the arrangement surface and the protrusion to prevent the coil spring from being disconnected from the boss, and
a portion of the boss ranging from the protrusion to an end portion of the boss in an opposite direction away from the arrangement surface includes a first region having a first diameter, and a second region which is nearer to the end portion than the first region and has a diameter smaller than the first diameter, and a step intervenes between the first region and the second region.

8. The spring fixing member according to claim 7, wherein the side surface of the boss in the first region is in contact with the winding of the coil spring, and the side surface of the boss in the second region is not in contact with the winding of the coil spring.

* * * * *